United States Patent
Nishiguchi et al.

(10) Patent No.: US 9,160,981 B2
(45) Date of Patent: Oct. 13, 2015

(54) SYSTEM FOR ASSISTING DRIVING OF VEHICLE

(75) Inventors: Haruhiko Nishiguchi, Wako (JP); Kei Oshida, Wako (JP); Takashi Watanabe, Wako (JP); Tatsuya Iwasa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 482 days.

(21) Appl. No.: 13/636,970

(22) PCT Filed: Feb. 16, 2011

(86) PCT No.: PCT/JP2011/000845
§ 371 (c)(1),
(2), (4) Date: Oct. 19, 2012

(87) PCT Pub. No.: WO2011/118125
PCT Pub. Date: Sep. 29, 2011

(65) Prior Publication Data
US 2013/0038735 A1   Feb. 14, 2013

(30) Foreign Application Priority Data
Mar. 26, 2010   (JP) .................................. 2010-072213

(51) Int. Cl.
*H04N 7/18* (2006.01)
*B60R 1/06* (2006.01)
*B60R 1/12* (2006.01)

(52) U.S. Cl.
CPC .. *H04N 7/18* (2013.01); *B60R 1/06* (2013.01); *B60R 2001/1253* (2013.01); *B60R 2300/8026* (2013.01)

(58) Field of Classification Search
CPC ....................................................... H04N 7/18
USPC ........................................................ 348/150
See application file for complete search history.

(56) References Cited

U.S. PATENT DOCUMENTS 6,124,647 A * 9/2000 Marcus et al. ............... 307/10.1
2003/0122930 A1* 7/2003 Schofield et al. ............. 348/148
(Continued)

FOREIGN PATENT DOCUMENTS

EP   1 363 237 A1    11/2003
EP       1647447 A2 *  4/2006 ................ B60R 1/00
(Continued)

OTHER PUBLICATIONS

Extended European Search Report dated May 26, 2014 issued in the corresponding EP Patent Application 11758937.4.

*Primary Examiner* — Nhon Diep
(74) *Attorney, Agent, or Firm* — Carrier Blackman & Associates, P.C.; William D. Blackman; Joseph P. Carrier

(57) ABSTRACT

Disclosed is a device which is mounted on a vehicle, and captures a rear region of a vehicle and a blind spot region outside of a viewing range of a side mirror adjacent to the rear region of the vehicle. A captured image is subjected to image processing so that the blind spot region on the captured image is compressed. The image after subjected to the image processing is displayed so as to be visible to a driver. The blind spot region on the captured image is compressed so that a sudden change of position of a object in a horizontal direction on the captured image is suppressed, as against a change of distance from the vehicle to the object. Compression is performed so that the ratio of transition of position of the object in the horizontal direction on the captured image to transition of distance from the vehicle to the object is substantially the same as the ratio of transition of position of the object in the horizontal direction in the side mirror to transition of distance from the vehicle to the object. The phenomenon of the object's appearance as if the object suddenly accelerates in the vicinity of the vehicle is avoided.

15 Claims, 12 Drawing Sheets

(56) References Cited

U.S. PATENT DOCUMENTS

| | | | |
|---|---|---|---|
| 2005/0128061 A1* | 6/2005 | Yanai .......................... | 340/435 |
| 2007/0290823 A1* | 12/2007 | Watanabe et al. ............. | 340/435 |
| 2008/0132332 A1* | 6/2008 | Pryor ............................. | 463/31 |
| 2008/0151048 A1* | 6/2008 | Watanabe et al. ............. | 348/143 |
| 2012/0154591 A1* | 6/2012 | Baur et al. .................... | 348/148 |
| 2012/0217764 A1* | 8/2012 | Ishiguro et al. .............. | 296/1.07 |

FOREIGN PATENT DOCUMENTS

| | | |
|---|---|---|
| EP | 2 061 234 A1 | 5/2009 |
| JP | 2001-197482 A | 7/2001 |
| JP | 2003-339044 A | 11/2003 |
| JP | 2004-194169 A | 7/2004 |
| JP | 2008-022125 A | 1/2008 |

* cited by examiner (a)

(b)

SYSTEM FOR ASSISTING DRIVING OF VEHICLE

CROSS-REFERENCE TO RELATED APPLICATION

This application is a National Stage entry of International Application No. PCT/JP2011/000845 filed Feb. 16, 2011, which claims priority to Japanese Patent Application No. 2010-072213 filed Mar. 26, 2010, the disclosure of the prior applications are hereby incorporated in their entirety by reference.

FIELD OF THE INVENTION

The present invention relates to a system for assisting driving of a vehicle, more particularly, to a device for processing and displaying a captured image so as to make a passenger easy to visually recognize surroundings of the vehicle.

RELATED ART

In the past, there has been proposed a device for processing images taken by a camera mounted on a vehicle for easy viewing by passengers and for displaying images of the surroundings of the vehicle to assist driving of the vehicle.

In the following Patent Document 1, there is disclosed a device, in which a camera is provided on at least one door mirror. In order to make an object in the image captured by the camera substantially the same size as the object's view in on the door mirror, image data of a rear region is magnified and the image data of a blind spot region out of a viewing range of the door mirror adjacent to the rear region is compressed for display.

PRIOR ART DOCUMENT

Patent Document 1: JP 2008-22125 A

SUMMARY OF THE INVENTION

Problem to be Solved

A range that an imaging device can cover is usually set wider than a range over which visual recognition can be made through a side mirror (including a door mirror) provided for visually recognizing the rear of a vehicle For this reason, when an image taken by the imaging device is displayed on a display device, it looks, on the display device, as if another vehicle suddenly accelerates in the vicinity of the driver's own vehicle, even when another vehicle approaches the own vehicle at a constant speed from the rear.

Here, as one example, when another vehicle Va approaches the own vehicle Vo at a constant speed from the rear as shown respectively in FIGS. 14A and 14B, transition of a vehicle Va reflected on a door mirror having a curvature of 700 R of the own vehicle Vo, and transition of the vehicle Va displayed on an image captured by a camera (an imaging device) of the own vehicle Vo are shown. A distance value assigned to each image denotes a distance from a mounting position of the camera to the door mirror of the own vehicle Vo (in this example, the camera is attached to a right door mirror) to the vehicle Va. For example, an image corresponding to a distance value of "10 m" shown in FIG. 14A indicates an image reflected on the door mirror when the vehicle Va is at a position apart by 10 m backwards from the mounting position of the camera. Meanwhile, an image corresponding to a distance value of "7 m" shown in FIG. 14B indicates an image taken by the camera when the vehicle Va is at a position apart by 7 m backwards from the mounting position of camera.

On a surface of the door mirror and on the left end of the captured image, a part of the body of the own vehicle Vo is reflected. A point P indicated by a white circle denotes the front center of the vehicle Va (here, a position of emblem of a front grill).

As will be seen by tracking the position of the point P shown in FIG. 14A, a position of the approaching vehicle Va reflected on the door mirror gently changes, as the distance value becomes smaller. In a region where the distance value is smaller than about 4 m is out of a viewing range i.e., in a blind spot region, and the vehicle Va does not appear in the door mirror.

On the other hand, as will be seen by tracking a position of the point P in FIG. 14 (b), until the vehicle Va approaches the blind spot region, the position of the approaching vehicle Va in the captured image gently changes as the distance value becomes smaller. However, in the blind spot region, the amount of change of the position of the point P in the captured image suddenly increases in a horizontal direction in contrast to the amount of change in the distance value. Consequently, it looks as if another vehicle Va suddenly accelerates in the vicinity of the own vehicle Vo.

In this way, even when the vehicle Va travels at a constant speed, it looks, on the captured image, as if the vehicle Va suddenly accelerates in the vicinity of the own vehicle Vo. Because a sensed speed recognized through the captured image and a sensed speed recognized through the door mirror or by direct visual observation are different, the passenger may feel somewhat abnormal and may not correctly recognize acceleration of the vehicle Va.

Further, as shown for example in a region 301, the front end of the vehicle Va is displayed as though the front end of the vehicle Va stretches, as the vehicle Va enters the blind spot region. This gives the passenger an impression that a shape of the vehicle Va is unnatural.

In the above prior art, the image processing is applied to the captured image. For the rear region, the object in the image is magnified so as to have the same size as an image displayed on the door mirror, and for the blind spot region, the captured image is compressed. Nonetheless, the prior art fails to disclose a specific technique for compression. Therefore, as sated above, it looks as if the vehicle suddenly accelerates or suddenly decelerates in regions in the vicinity of the own vehicle, even if a speed of the vehicle approaching from the rear is constant. Moreover, the shape of the vehicle may look unnatural.

Thus, an objective of the present invention is to provide a technique for assisting driving of a vehicle by applying image processing to an image of the rear view so that the speed and shape of the vehicle approaching from the rear look natural.

Solution to the Problem

According to one aspect of the present invention, a driving assisting system comprises an imaging device that is mounted on a vehicle, and can capture images of a rear region of the vehicle and a blind spot region out of a viewing range of a side mirror adjacent to the rear region of the vehicle. The system comprised an image processing unit (17) that processes images captured by the imaging device so as to compress an image region corresponding to the blind spot region on the captured image. The system also comprises a display device (15) that displays the image processed by the image processing unit such that the images are visible to a driver seated in the vehicle. The image processing unit compresses the image region corresponding to the blind spot region on the captured image so that a sudden change of position of a object in a horizontal direction on the captured image is suppressed, as against a change of distance from the vehicle to the object.

According to the invention, since the blind spot region on the captured image is compressed so that the sudden change of position of the object in the horizontal direction on the captured image is suppressed, as against the change of distance from the vehicle to the object. The invention enables suppressing the occurrence of an event which looks, on the captured image, as if an object such as another vehicle etc., suddenly accelerates or suddenly decelerates in the vicinity of the own vehicle. Hence, a passenger of the own vehicle can recognize a speed of the object approaching from the rear, with more accuracy, without making the passenger feel that something is wrong. For example, when the own vehicle makes a traffic lane change to a neighboring traffic lane, the passenger can visually recognize the captured image and correctly recognize acceleration of another vehicle driving on the neighboring traffic lane. Further, with this compression technique, as described above, the invention prevents the front end of the object, such as another vehicle, etc., from being displayed, on the captured image, stretched in the vicinity of the own vehicle. This enables a shape of the object to look more natural.

According to one embodiment of the present invention, the image processing unit compresses the image region corresponding to the blind spot region so that the ratio of transition of position (141) of the object in the horizontal direction on the captured image to transition of distance from the vehicle to the object is substantially the same as the ratio of transition of position (143,145) of the object in a horizontal direction on the side mirror transition of distance from the vehicle to the object. Thus, the invention enables displaying the object on the captured image as if the object approaches the own vehicle at the same speed as the moving speed of the object. Accordingly, a driver of the own vehicle can visually recognize the speed of the object, such as a vehicle, etc., approaching from the rear, by visually recognizing the captured image, without making the driver feel that something is wrong, as with a case where the driver visually recognizes from the side mirror.

According to one embodiment, the image processing unit compresses the image region corresponding to the blind spot region so that the maximum value of the ratio (max×$v_{MIR}$) of transition of position (141) of the object in the horizontal direction on the captured image to transition of distance from the vehicle to the object is substantially the same as the ratio of transition of position (143) of the object in a horizontal direction on the side mirror to transition of distance from the vehicle to the object. Thus, the maximum value of the moving speed of the object on the captured image is limited to the maximum value of the moving speed of the object in the side mirror. Accordingly, the invention ensures preventing occurrence of a phenomenon as if the object suddenly accelerates or suddenly decelerates.

According to one embodiment of the present invention, the image processing unit compresses the image region corresponding to the blind spot region set according to an objective function (g(x)) of position in the horizontal direction to the distance so that the maximum value of the ratio (max×$v_{MIR}$) of transition of position (141) of the object in the horizontal direction on the captured image, as against the change of distance from the vehicle to the object is substantially the same as the ratio of transition of position (143) of the object in a horizontal direction on the side mirror to transition of distance from the vehicle to the object. Thus, the invention enables effective compression processing of the captured image by compressing the image region according to the objective function.

According to one embodiment of the present invention, transition of position (141) of the object in the horizontal direction on the captured image, as against transition of distance from the vehicle to the object is taken as a first function (f(x)), and wherein the image processing unit compresses the image region corresponding to the blind spot region at a compression ratio (CRh) based on the ratio of a inclination (L_CAM) of the first function to a inclination (L_g) of the objective function (g(x)). Since the compression ratio is determined in this way, the invention enables effective compression processing of the captured image.

Other features and advantages of the present invention will become apparent from the following detailed descriptions.

BRIEF DESCRIPTION OF THE DRAWINGS

FIG. 10A is a view showing an image captured by an imaging device.

FIG. 10B is a view showing a scaling factor of the original image shown in FIG. 10A, and FIG. 10C is a view showing an image after subjected to image processing by an image processing unit.

FIG. 10D is a view showing a scaling factor of the image shown in FIG. 10C.

FIG. 13A is a views showing an image reflecting on a door mirror having a curvature of 700 R.

FIG. 13B is a views showing a captured image, and FIG. 13C is a views showing an image after subjected to image processing by an image processing unit.

FIG. 14A is a views showing an image reflecting on a door mirror having a curvature of 700 R.

FIG. 14B is a views showing a captured image.

DESCRIPTION OF EMBODIMENTS

Figure 1:
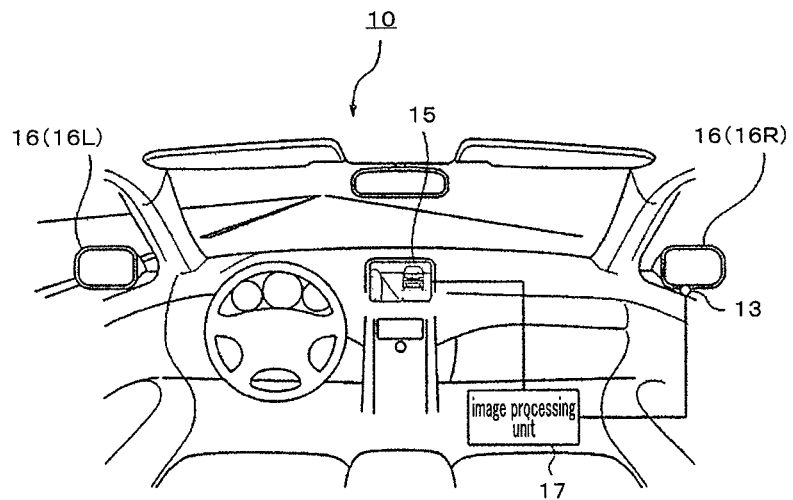
FIG. 1 is a block diagram of a driving assisting device according to one embodiment of the present invention.

Now, embodiments of the present invention will be described with reference to the accompanying drawings. FIG. 1 is a block diagram showing a device 10 which is mounted on a vehicle and is for assisting driving of the vehicle according to one embodiment of the present invention.

An imaging device 13 is a CCD camera or a CMOS camera etc., that is capable of imaging for example in a visible light region or in an infrared region, and is mounted on the vehicle so as to allow imaging backward of the vehicle on the right side or left side of the vehicle. For example, the camera can be mounted on at least one of left and right side mirrors (in this embodiment, door mirrors) 16L and 16R, for example, on a lower part of the side mirror at the passenger's seat beside a driver's seat. In this embodiment, the imaging device 13 is mounted at the lower part of the right side mirror 16R.

The imaging device 13 has a wide-angle lens whose angle of view (a field of view) is wider than that of a side mirror 16, and comprises a camera for imaging the outside in a predetermined wide-angle region from the right side to the rear of the vehicle. An image taken by imaging device is subjected to predetermined image processing, e.g., filtering, etc., to generate image data consisting of tow-dimensionally arrayed pixels, and eventually output to an image processing unit 17. Incidentally, the image processing unit 17 is illustrated separately from the imaging device 13 in FIG. 1, but, not limited thereto, the image processing unit 17 may be built in the imaging device 13.

The image processing unit 17 applies the image processing, including magnification and compression, as will be described later, to the image data of the backward view entered from the imaging device 13, and outputs the image data after being image processing to a display device 15. The display device 15 is provided at a position (e.g., approximately at the center in a vehicle width direction of an instrumental panel) visible to a passenger seated in the vehicle. For example, the display device 15 may be a liquid crystal display. The display device 15 may usually be implemented as, so-called, a display device for a navigation system (not shown), but it is not necessarily limited thereto. Instead, the display device 15 may be a display integrally provided with meters to display various display conditions or arranged in the vicinity of the meters, may be a Head Up Display (HUD), etc.

Alternatively, a display switching unit may be connected to the display device 15 to switch between presenting of a navigation image (map data, etc.) from the navigation system and presenting of an image received from the image processing unit 17. A specific technique thereof is described for example in JP 2008-22125 A. Here, the navigation system can be implemented by an already-known device.

The side mirror 16 is configured as a spherical surface mirror having a specified curvature. Alternatively, the side mirror may be configured of an aspherical surface mirror which is formed so that a curvature sequentially changes from the center of the mirror toward an outer circumference. The aspherical mirror has the advantage of increased angle of view, for example, 1.4 to 1.7 times larger than the spherical mirror having a constant curvature.

The side mirror at the driver's seat side can be arranged so that a driver looking forward may see it at a neck swing angle of, for example, 5 degrees or so, and the side mirror at the assistant driver's seat side can be arranged so that the driver looking forward may see it at a neck swing angle of, for example, 30 degrees or so.

Figure 2:
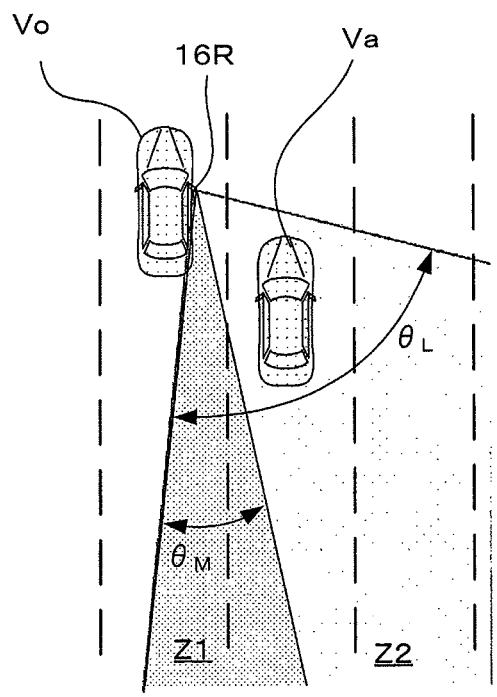
FIG. 2 is a view showing one example of an imaging range of an imaging device and a viewing range of a side mirror according to one embodiment of the present invention.

A viewing range of the side mirror 16 is set so that a rear side region (hereinafter, referred to as the rear side of the own vehicle) of a neighboring traffic line adjacent to the traffic lane of the own vehicle is visible. For example, FIG. 2 shows the own vehicle Vo and another vehicle Va moving on the neighboring traffic lane. A viewing range Z1 of a side mirror (in this example, a right door mirror 16R) at the assistant driver's seat side of the vehicle Vo is set, for example, so that an angle of view $\theta_M$ is 10 to 20 degrees or so according to a specified eye point (a point of view) of the driver. Among these, the angle of view is set so that a reflected view of the body of the own vehicle Vo is, for example, 5 degrees or so.

Further, an imaging range of the imaging device 13 provided at a lower part of the right side mirror 16R is set to include the rear region Z1 of the own vehicle Vo that is a viewing range of the right side mirror 16R, and a blind spot region Z2, a region outside the viewing range of the right side mirror 16R adjacent to the rear region Z1. For example, an angle of view $\theta_L$ is set to 80 degrees or so. Out of the imaging ranges (Z1+Z2), a region that overlaps with the body of the own vehicle is set, for example, to 8 degrees or so, in terms of an angle of view.

If another vehicle Va is present within the blind spot region Z2, the vehicle Va cannot be visually recognized through the side mirror 16R, but the vehicle Va can be visually recognized on an image captured by the imaging device 13.

Figure 3:
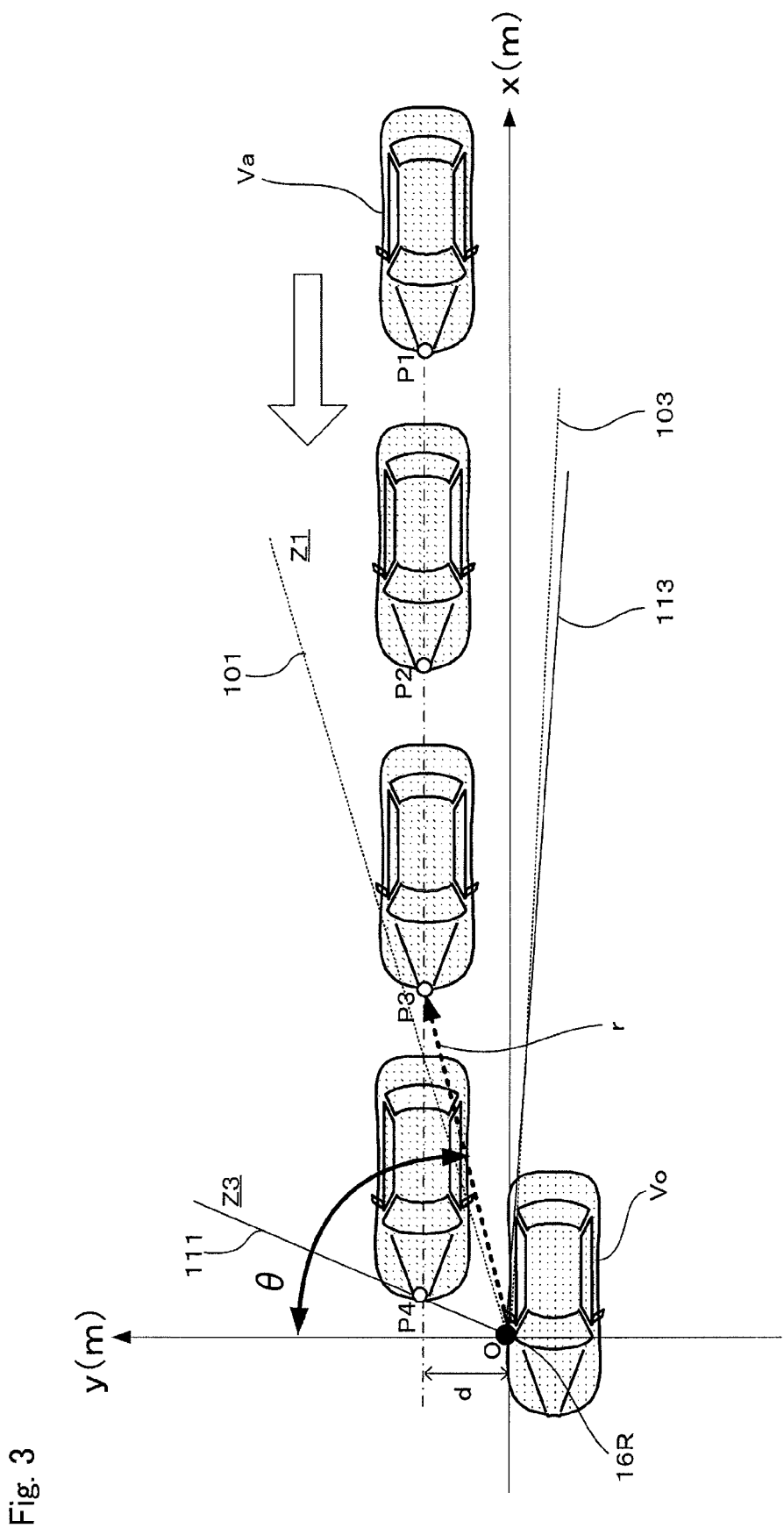
FIG. 3 is a view explaining a change of angle θ relative to another vehicle from an own vehicle when another vehicle approaches the own vehicle according to one embodiment of the present invention.

Here, an object and an outline of the image processing by the image processing unit 17 will be described. As mentioned above referring to FIG. 14, it looks, on an image (called as a captured image) taken by the imaging device, as if the object suddenly accelerates in the vicinity of the own vehicle, even when the object, such as another vehicle, etc., approaches the own vehicle at a constant speed. In view of the causes of such an event, FIG. 3 shows, in a real space, a state where another vehicle Va moving on a neighboring traffic lane of the own vehicle Vo approaches the own vehicle Vo at a constant speed from the rear. Here, let's suppose that the imaging device 13 is mounted at a lower part of the right side mirror 16R of the own vehicle Vo. As an example, viewing region of the side mirror 16R or the rear side region Z1 (a region between a line 101 and a line 103) and the imaging region Z3 (a region between a line 111 and a line 113) of the imaging device 13 are shown. As stated referring to FIG. 2, a region (in FIG. 2, a region between the line 101 and the line 111) other than the rear side region Z1 in the imaging region Z3 is the blind spot region Z2 of the side mirror 16R.

With a mounting position (the same position as a mirror surface of the side mirror 16R) of the imaging device 13 being the origin O, a xy coordinate system is set such that a x axis extends in a vehicle length direction of the own vehicle Vo, and a y axis extends in a vehicle width direction. Transition of a predetermined position P (in FIG. 3, a position at an emblem on a front grill) at the front center of another vehicle Va is represented as a sequence of points P1 to P4 when the vehicle Va approaches the own vehicle Vo. Here, let's assume that an angle formed between a straight line r connecting the point P and the origin O and the y axis to be θ. In FIG. 3, the straight line r and the angle θ are shown as one example when the point P is located at a position P3. If the distance in the y axis direction from the origin O to the point P is d, the angle θ can be represented by a relational expression of θ=arctan (x/d). d is the distance from the own vehicle Vo to the other vehicle Va in y axis. The distance d can be found by adding a distance in the y axis direction from the own vehicle Vo to the left side of the other vehicle Va and a half of a vehicle width of the other vehicle Va. The distance d may be set in advance (e.g., 2.4 m).

Figure 4:
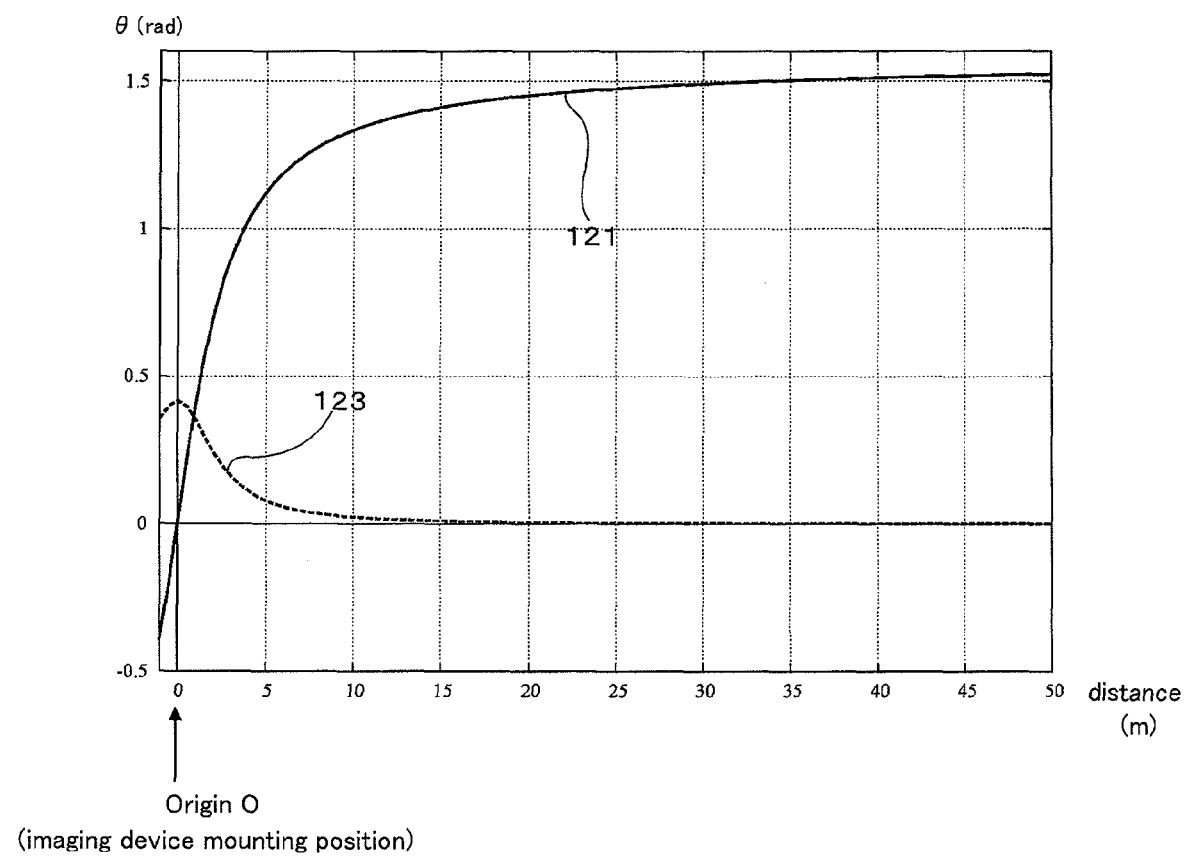
FIG. 4 is a view explaining by a graph an angle θ and a first-order differential value of the angle θ shown in FIG. 3 according to one embodiment of the present invention.

Referring to FIG. 4, a graph 121 is illustrated to indicate transition of the angle θ when the other vehicle Va approaches from the rear 50 m far as shown in FIG. 3, to pass the own vehicle Vo. Here, the horizontal axis indicates a distance (m) from the own vehicle Vo (to be exact, the origin O that is a mounting position of the imaging device 13) or a value of the x axis, and the vertical axis indicates an angle θ (rad). The angle θ takes a positive value in the right direction and a negative value in the left direction, with the angle on the y axis being θ(rad). Thus, the angle on the x axis in a first quadrant is θ=2/π (rad), and on the x axis in a second quadrant is θ=−2/π (rad).

The graph 123 shows a value obtained by first-order differentiation of the angle θ i.e., dθ(x)/dx. The angle takes the maximum value when x=0 and takes zero when x=∞ (infinity). In other words, it can be seen that the amount of transition in the angle θ per unit distance increases as the angle comes close to the origin O.

Assuming that another vehicle Va approaches the own vehicle Vo at a constant speed, the x axis shown in FIG. 4 can be regarded as a time axis. At this moment, the amount of transition in the angle θ per unit distance can be regarded as the amount of transition in the angle θ per unit time i.e., as angular velocity. From this, it can be seen that the angular velocity increases as another vehicle Va approaches the own vehicle Vo.

Figure 5:
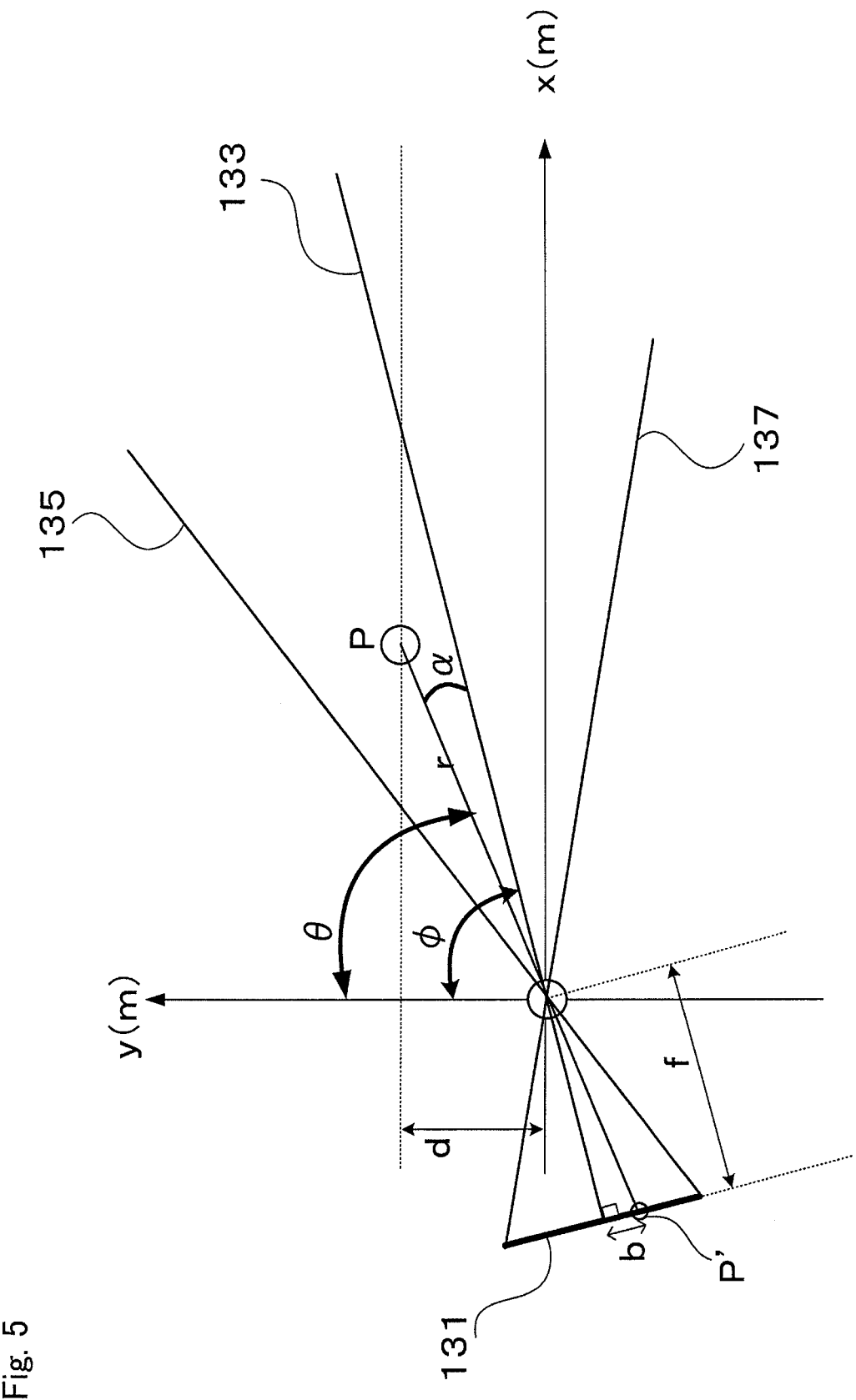
FIG. 5 is a view explaining a position b (a distance value from the center) of a object in a horizontal direction to be projected on a screen according to one embodiment of the present invention.

Referring then to FIG. 5, there is shown a relation between the imaging surface 131 (a surface of an imaging element (e.g., a CCD element) provided in the imaging device 13) and the point P on another vehicle Va. A lens of the imaging device 13 is arranged at the origin O and an optical axis 131 of the imaging device 13 extends so as to pass through the lens (origin O) in a vertical direction with respect to the imaging surface 131. Here, an angle formed between the optical axis 133 and the straight line r is taken as α, and an angle formed between the optical axis 133 and the y axis is taken as φ. An area that has the optical axis 133 as a center and lies between a line 135 and a line 137 is a viewing range (i.e., an imaging range) of the imaging device 13. A point formed by projecting the point P on the imaging surface 131 of the imaging device 13 is indicated by a point P'. The distance b in a transverse direction (horizontal direction) from the center of the imaging surface of the point P' is expressed by the following equation (1), where f denotes a focal length of the imaging device 13.

$$b = f \cdot \tan\alpha \qquad \text{equation (1)}$$
$$= f \cdot \tan(\arctan(x/d) - \varphi), \varphi \neq 0$$

As is evident from this equation (1), when angular velocity θ(=arctan (x/d)) increases, the amount of transition in the distance b (i.e., the amount of transition in a position in a horizontal direction). This means that a moving speed of the point p' in a horizontal direction on the imaging surface increases. When φ is not 0, a moving speed of another vehicle Va which is expected to approach at a constant speed looks, on the imaging surface, as if the moving speed increases, as another vehicle Va approaches the own vehicle Vo.

Figure 6:
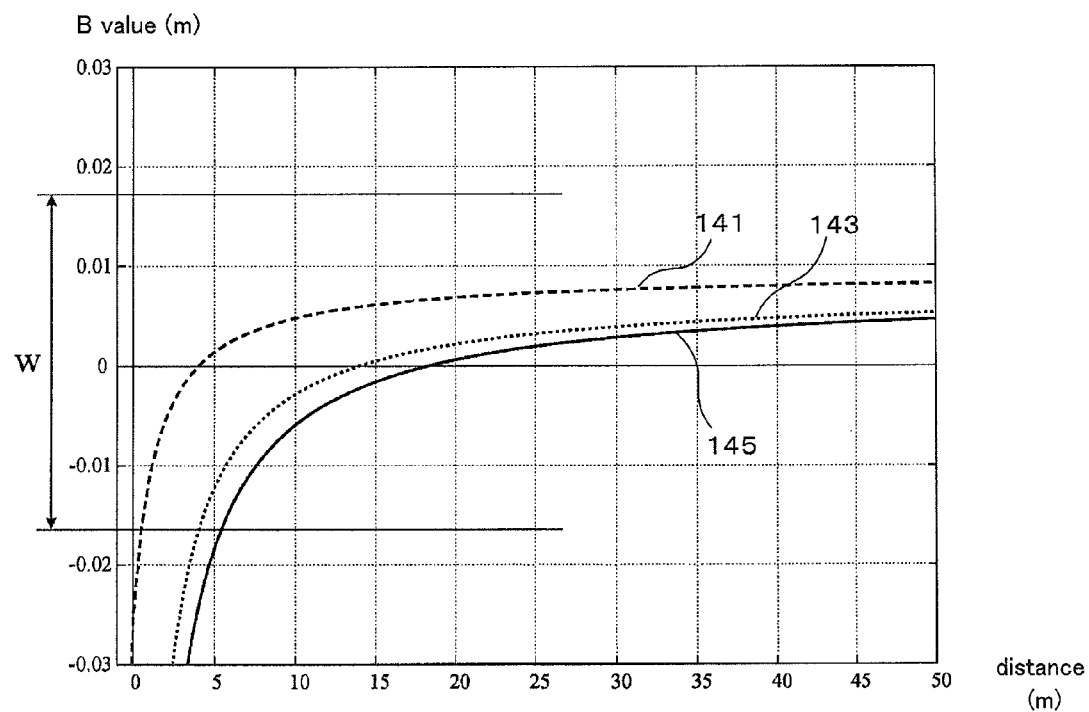
FIG. 6 is a graph showing a distance value b of an imaging device and a side mirror according to one embodiment of the present invention.

An event of such an increase of the moving speed is not peculiar to the camera (the imaging device), and similar event would take place when a driver sees the moving speed through the side mirror. Referring now to FIG. 6, as shown in FIG. 3, a horizontal axis indicates in a real space a distance (m) from the origin O in the x direction and a vertical axis indicates a distance (m) in a horizontal direction from the center of a projecting plane i.e., the above value b. Here, the projecting plane indicates a plane on which the point P is projected in the imaging device 13 and the side mirror 16. In case of the imaging device, the projecting plane corresponds to the imaging plane.

Figure 14:
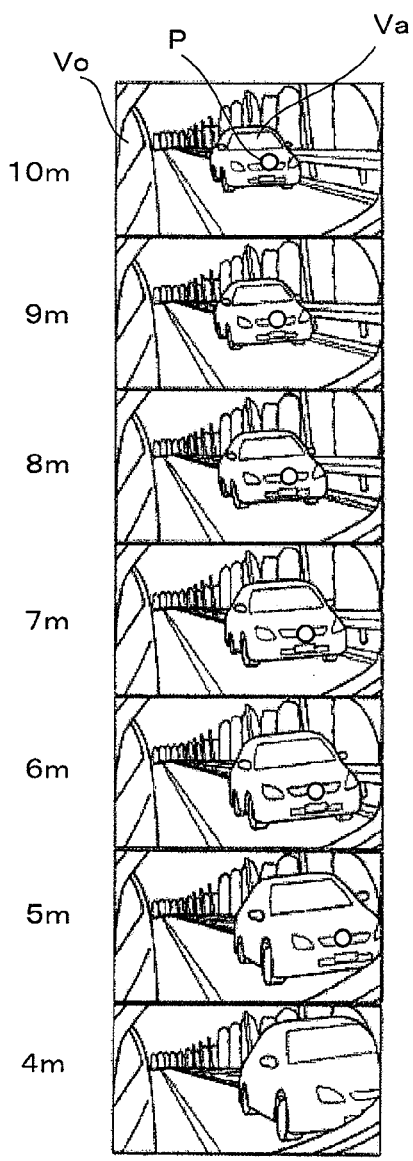
FIG. 14 is a view showing an image acquired at each distance by an experiment for each distance.
Figure 14:
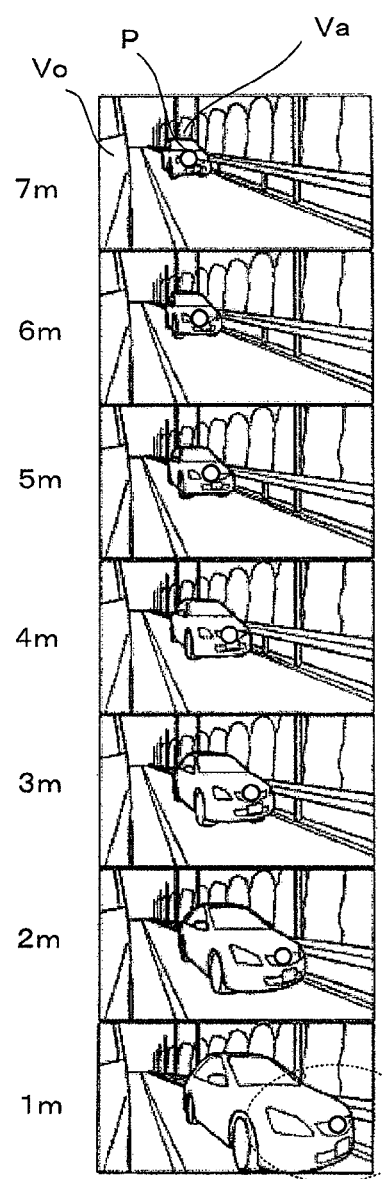

The graph denoted by reference numeral 141 is a graph plotting the value b for each position (value x) of the point P in the real space by calculating the value b according to the equation (1), for the imaging device (camera) equipped with a lens having an angle of view of 80 degrees. Graphs denoted by reference numeral 143 and reference numeral 145 are graphs plotting the value b, as with the above example, for a side mirror having a curvature of 700 R and for a side mirror having a curvature of 1000 R, regarding the side mirrors as cameras. The point P taking a positive value b indicates that a position lies on the left side from the center of the image, and the point P taking a negative value b indicates that the position lies on the right side from the center of the image as viewed in the image as shown in FIG. 14.

To compare these three values under the same conditions, the value b is found using a value of the focal length f, "35 mm conversion". As is widely known, the focal length of "35 mm conversion" is a focal length when a 35 mm film is used. Therefore, once the focal length is fixed, its view of angle (a field of view) is eventually fixed. Accordingly, for example, in case of the side mirror having a curvature of 700 R, the value b is calculated according to the equation (1) using the value of the focal length f, 35 mm conversion, corresponding to a view of angle of the side mirror. The results thereof are illustrated as a graph 143. It is assumed here that the angle φ determining the optical axis 133 for the side mirror is set such that the amount of reflection on an imaging surface of a door panel of the own vehicle is the same as that of the imaging device 13 (the camera). Admittedly the size of a mirror surface of a side mirror and that of the imaging surface are different, but the size of a screen is normalized by conducting such a conversion, which allows comparison of the value b under the same conditions, despite different angle of view. A width of the screen when 35 mm conversion is conducted amounts to 36 mm as is widely known. Thus, a W shown in FIG. 6 corresponds to 36 mm and represents a width in a horizontal direction of the screen.

For each graph, as an intersection with the right end of the screen i.e., with the lower end of the width W clearly shows, the angle of view of the side mirror is relatively narrow, and is 28 degrees or so at the widest. On that account, in a proximate region (in an example shown in FIG. 6, a region where the distance value is smaller than about 4 meters) where a transition speed of the value b i.e., a moving speed of the point P' in the screen increases, another vehicle Va is already out of a viewing region (in a blind spot region) of the side mirror. For that reason, another vehicle Va is not reflected on the side mirror. Contrarily, as the imaging device with a wide-angle lens having an angle of view wider than that of the side mirror also images a proximate region of the own vehicle Vo, another vehicle Va is displayed on the captured image as if the another vehicle accelerates. Thus, difference will occur in the sense of speed recognized by a passenger between the captured image and the view in the side mirror.

The present invention provides a scheme of compressing a region in the vicinity of the own vehicle in the captured image wherein a passenger may feel that another vehicle approaches at a constant speed when viewing the side mirror or the captured image. This scheme focuses on angular velocity θ within a range covered by the side mirror, and angular velocity θ within the region covered by the imaging device in the proximate region of the own vehicle Vo.

Figure 7:
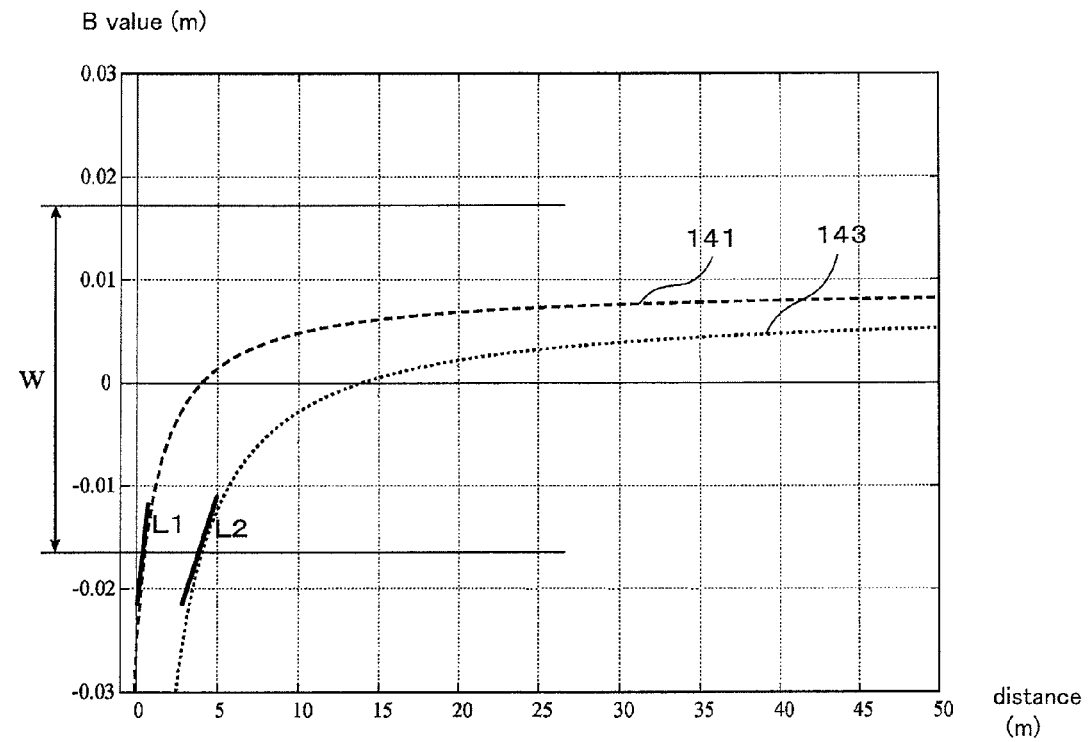
FIG. 7 is a view showing a inclination of a graph of a distance value b of an imaging device and a side mirror according to one embodiment of the present invention.

First, a basic idea of this technique will be described referring to FIG. 7. FIG. 7 is a view in which a straight line L1 and a straight line L2 (represented by a thick line) are added respectively to the graph 141 and the graph 143. The straight line L1 represents first-order differentiation at the right end of the screen (a lower end of W) and a slop of the straight line L1 indicates the maximum amount of transition per unit distance (as described above, it may be considered to be unit time). Similarly, the straight line L2 indicates first-order differentiation of the right end of the screen in the graph 143 of the side mirror and a slop of the straight line L2 indicates the maximum amount of transition per unit distance. In other words, the straight line L1 and the straight line 12 represent the maximum value of the moving speed of the projection point P' on the screen corresponding to the point P.

Comparison of the straight line L1 and the straight line L2 indicates that the maximum value $\max v_{CAM}$ of the moving speed in the graph 141 of the imaging device is larger than the maximum value $\max \times v_{MIR}$ of the moving speed in the graph 143 of the side mirror. In this example, it is approximately twice. A moving speed of a point on the captured image corresponding to the point P becomes slower by displaying the captured image in compression, and conversely becomes faster by displaying the captured image in magnification.

As described above, in order not to produce a strange feeling about the travel speed on the captured image of the point P', the captured image should be compressed so that the travel speed represented by the straight line L1 matches the travel speed represented by the straight line L2. To this end, as shown in the equation (2), a function g(x) is set in which the amount of transition per unit distance at the right end of the captured image (in this example, corresponding to a distance of x=1) matches the above maximum value $\max v_{MIR}$ of the side mirror. Scaling process of an image captured by the imaging device is performed, with the function g(x) as a target value.

$$\left.\frac{dg}{dx}\right|_{x=1} = \max v_{MIR} \qquad \text{eqution (2)}$$

Because the distance value x corresponding to the right end of the captured image is 1, it is set to "x=1" in the equation (2). But, the distance value is not necessarily limited thereto, it may vary depending on a mounting position, etc., of the imaging device.

Figure 8:
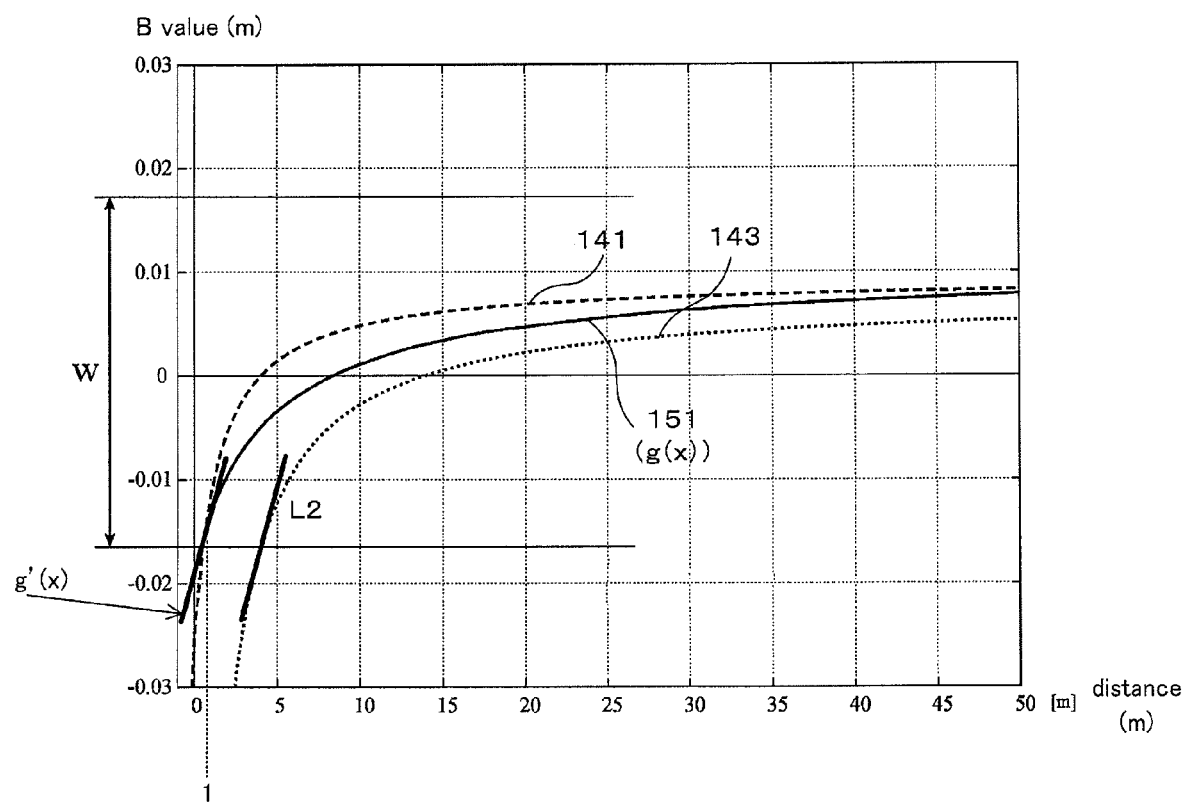
FIG. 8 is a graph showing an objective function (g(x)) according to one embodiment of the present invention.

Referring to FIG. 8, an example of the objective function g(x) is shown as a graph 151, and first-order differentiation at the right end of the screen in the graph 151 i.e., dg(1)/dx is represented as a straight line g'(x). As a function g (x) satisfying the above equation (2), various loci may be lined up, but any of them may be used, as far as the function satisfies the above equation (2). However, it is preferable, as shown in FIG. 8, that the function smoothly changes between the graph (here, the graph 141) of the imaging device 13 to be mounted on the own vehicle Vo and the graph (here, the graph 143 of the side mirror having a curvature of 700 R) i.e., continuously changes. For example, the function g(x) may be set, so-called, as "a smooth function (a continuously differentiable function)". Instead, a value of first-order differentiation may be set to monotonically decrease in a direction in which a value x increases.

When the objective function g(x) is set in this way, the scaling process of an image (also called as an original image) captured by the imaging device 13 is performed according to the objective function g(x). Here, an image after the scaling process is called a target image. Comparison is then made between a inclination L_g of the graph 151 indicative of the objective function g(x) and a inclination L_CAM of the graph 141 of the imaging device 13, for every area (may be consisting of 1 or plural pixel rows) obtained by subdividing the target image in a horizontal direction. If the L_CAM is greater than the L_g, a corresponding area in the original image is compressed in the horizontal direction. Otherwise, if the L_CAM is equal to L_g, no compression or magnification is applied to the original image (i.e., full-scale). Namely, if the L_CAM is smaller than the L_g, the corresponding area in the original image is magnified in the horizontal direction.

Herein, a scaling factor CRh is expressed by the following equation (3). In this example, a scaling factor larger than a value 1 indicates compression (i.e., the corresponding area in the original image is multiplied by 1/CRh times in the horizontal direction). A scaling factor smaller than a value 1 indicates magnification (i.e., the corresponding area in the original image is multiplied by CRh times in the horizontal direction).

$$CRh = \frac{L - CAM}{L - g} \qquad \text{equation (3)}$$

Figure 9:
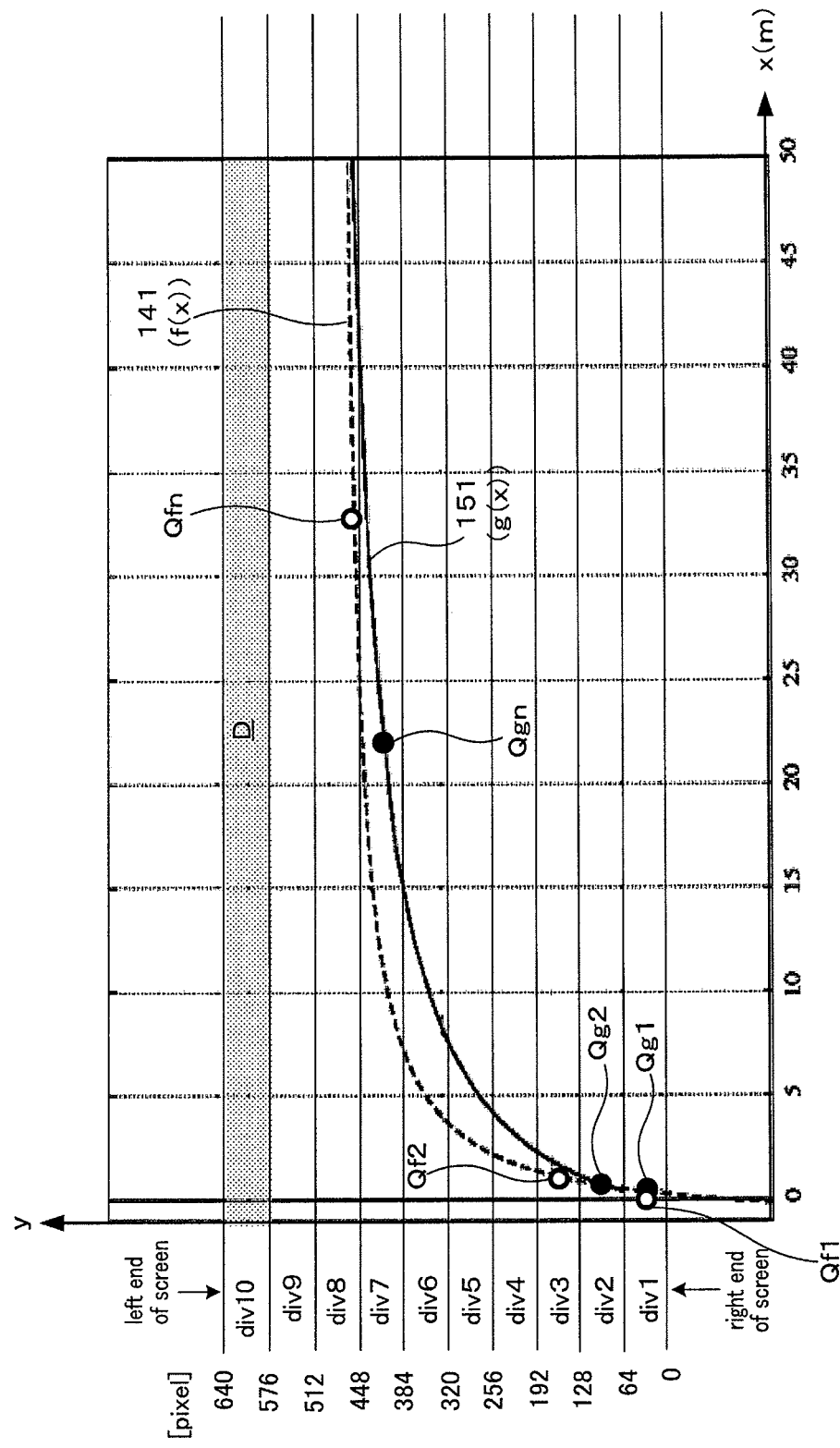
FIG. 9 is a graph explaining setting of a scaling factor based on an objective function (g(x)) according to one embodiment of the present invention.

A more specific description will be made to the scaling process referring to FIG. 9. In FIG. 9, the same view is shown as with FIG. 8. Here, the graph 141 of the imaging device 13 is the function f(x). A y axis is taken in a horizontal direction of the screen, and the width W of the screen is divided at regular intervals e.g., into 10 areas. In this example, as the width W has 640 pixels, 10 areas div1 to div10 each of which has 64 pixels in a horizontal direction are defined.

In the first area div1 at the right end of the screen, comparison is made between the inclination L_CAM of the objective function f(x) of the imaging device 13 and the inclination L_g of the objective function g(x) at a position having the same y value (in this example, a y value at the center in a horizontal direction of the first area div1, i.e., at y=32 at (a position of pixel). In other words, the inclination L_CAM of a point Qf1 on the function f(x) at y=32, and the inclination L_g of a point Qg1 on the function g(x) at y=32 the inclination L_g of the point Qg1 on the function g(x) at y=32 are acquired to calculate the scaling factor CRh according to the equation (3). In this way, a scaling factor CRh1 for the first area div1 is found.

In the second area div2, for the objective function g(x), the inclination L_g of a point Qg2 on the function g(x) of the y value (in this example, y=96) at the center in a horizontal direction of the second div2 is acquired. For the function f(x) of the imaging device 13, a position moving toward the left of the screen from the point Qf1, as much as "64 (it is the number of pixels of one area)×CRh1" is located referring to the scaling factor CRh1 in the first area to acquire the inclination L_CAM of the point Qf2. For example, because if the CRh1 is 2.0, then 64×2=128, a position moving in a left direction of the screen by 128 pixels from the point Qf1 is the point Qf2. The scaling factor CRh is found according to the equation (3) using the inclination L_CAM of the point Qf2 and the inclination L_g of the point Qg2 thus acquired. This is a scaling factor CRh2 for the second area div2.

For areas after the third area div3, the same calculation as that of the second area is performed. For the objective function g(x), since the screen is subdivided at regular intervals in the horizontal direction, the inclination L_g of a point Qgn on the function g(x) of the y value at the center in the horizontal direction of nth (n=2 to 10) area is acquired. For the function f(x), by a value obtained by multiplying a scaling factor CRh(n−1) of a preceding area ((n−1)th area) and the interval of the area (in this example, 64 pixels), a position is moved in the left direction from a point Qf (n−1) of the function f(x), and the inclination L_CAM of the function f(x) of the point Qfn reached by this move is obtained. In this way, a scaling factor CRhn for the nth area is found according to the above equation (3). In FIG. 9, one example of the point Qgn and the corresponding point Qfn are shown.

Thus, the scaling factor CRh of each area is determined. In this example, the screen is divided into 10 areas in a horizontal direction to determine the scaling factor for every area. However, this is merely one example and may be divided into any number. Further, the screen needs not be divided at an equal distance. The scaling factor may be decided for each pixel column.

Indicated as area D in FIG. 9 is an area where a part of the body of the own vehicle Vo is captured, and the size thereof in a horizontal direction is determined beforehand (in this example, 10th area div10). In this area, no scaling is performed, and instead full-scale processing is performed.

Figure 10:
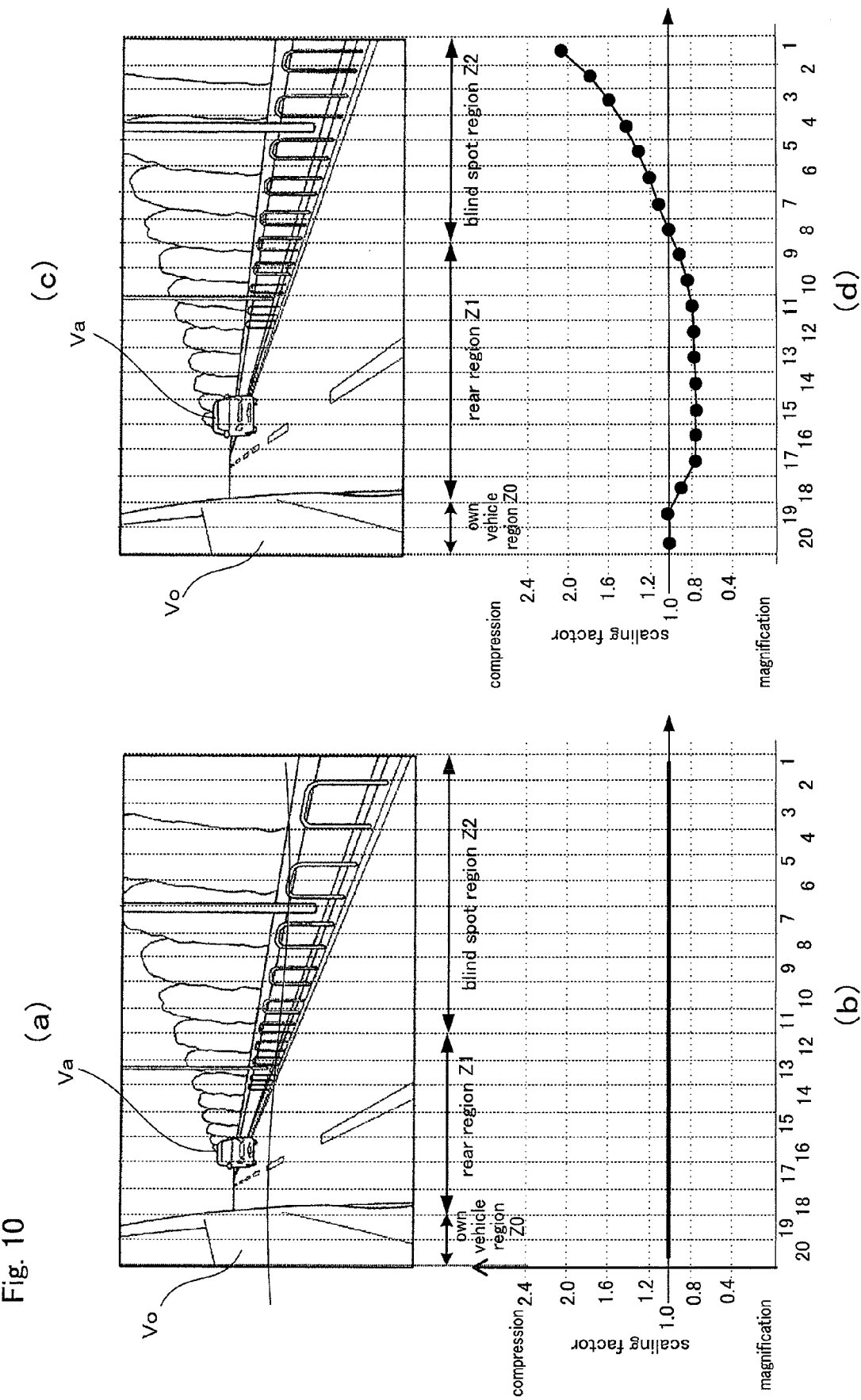
FIG. 10 is a view according to one embodiment of the present invention.

FIG. 10 shows an example of results of the scaling process according to one embodiment of the present invention. An image shown in FIG. 10A is an image (an original image) taken by the imaging device 13. In this example, the image is divided at regular intervals into 20 areas in a vehicle width direction (a horizontal direction). In the original image, a part of the body of the own vehicle Vo is reflected in a 19th area and a 20th area (hereinafter, this area is called as an own body region Z0). Image data in a 1th area to a 11th area indicates a blind spot region Z2, and image data in a 12th area to a 18th area indicates a rear region Z1.

A graph in FIG. 10B is shown for comparison purposes with a graph shown in FIG. 10D to be described later, and shows the scaling factor for every area shown in FIG. 10A. As an image shown in FIG. 10A is the original image to which no scaling process is applied, a scaling factor corresponding thereto shown in FIG. 10B is fixed to 1.0.

An image shown in FIG. 10C shows an image after subjected to the scaling process of the original image shown in FIG. 10A by the aforesaid image processing unit 17. A graph in FIG. 10D shows a scaling factor for every area shown in FIG. 10C. Although the number of divisions of an image in a horizontal direction is different, the scaling factor is found according to the same calculation as that described referring to FIG. 9. In this embodiment, as shown in the equation (3), the scaling factor is represented by the ratio of a horizontal width of the image (i.e., the original image) before subjected to the scaling process to a horizontal width of an image after subjected to the scaling process. Therefore, a compression ratio has a value larger than 1.0 and a magnification ratio has a value smaller than 1.0. For example, a scaling factor corresponding to the first area of the image shown in FIG. 10C is about 2.0 and so the first area shown in FIG. 10D indicates an area which is compressed to approximately half the area of the corresponding original image in a horizontal direction.

Alternatively, the scaling factor may be represented by the ratio of a horizontal width of an image after subjected to the scaling process with respect to a horizontal width of an image before being subjected to the scaling process.

As shown in FIG. 10 (d), the own vehicle body region Z0 (the area corresponding to the area D shown in FIG. 9) is fixed to full-scale. In a region (in this example, an area going from the 19th area to the 17th area) changing from the own body region Z0 to the rear side region Z1, the area smoothly changes so as not to produce a strange feeling in the image after the scaling process. Moreover, in this example, the scaling factor is set so that average magnification of the whole image is 1.0. By doing this way, information of the original image may be contained, without omission, in the image after the scaling process. In this case, the above objective function g(x) may be set taking account of the fact that the average magnification is 1.0.

As can be seen from FIG. 10, in the image area corresponding to the rear side region Z1, magnification process is performed. With such a process, the image of an object lying in the rear side region becomes easy to see. Further, in the image area corresponding to the blind spot region Z2, compression process is performed. As stated above, correct sense of speed of the object lying in the blind spot region Z2 is recognized from this image.

A map according to the scaling factor as shown in FIG. 10 (d) can be created beforehand and stored in a storage device (a memory, etc.) of the image processing unit 17.

Figure 11:
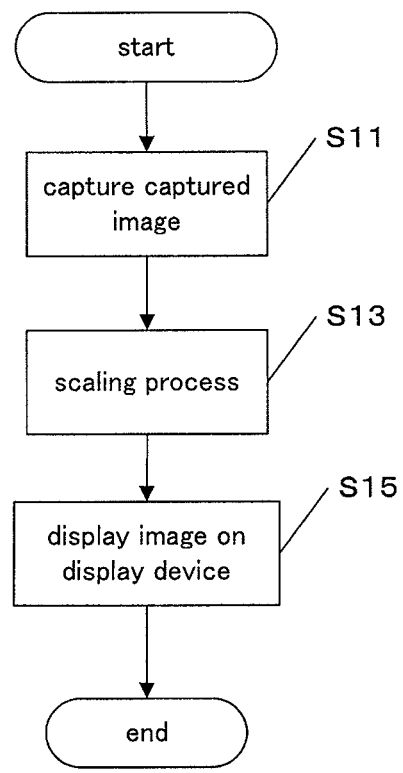
FIG. 11 is a flow chart of a image processing process to be performed by an image processing unit according to one embodiment of the present invention.

FIG. 11 shows a flow chart of an image processing process performed by the image processing unit 17 according to one embodiment of the present invention. Such a process can be performed at predetermined time intervals.

In step S11, data of an image captured by the imaging device 13 is acquired. In step S13, the scaling process is performed. Specifically, an image (called as a target image) after the scaling process is subdivided e.g., at regular intervals for every q pixel in a horizontal direction, and n areas are defined as described referring to FIGS. 9 and 10. In this manner, the target image can be sequentially generated starting from the first area.

For example, as described referring to FIG. 9, a corresponding scaling factor of the first area is obtained by referring to a map of the scaling factor as shown in FIG. 10 (d). A corresponding area of the captured image (e.g., if the scaling factor is 2, a region having a width of q pixel×2 from the right side of the original image) is compressed to achieve the scaling factor for generating the first area of the target image. Likewise, a corresponding scaling factor of the second area is obtained by referring to the map. A corresponding area of the captured image (e.g., if the scaling factor is 1.7, a region having a width of q pixel×1.7 adjacent to the area where the compression is performed) is compressed to achieve the scaling factor and to generate the second area of the target image. Repetition of such process up to the nth area generates the whole target image.

In step S15, the generated target image, i.e., the image after the scaling process is displayed on the display device 15.

Figure 12:
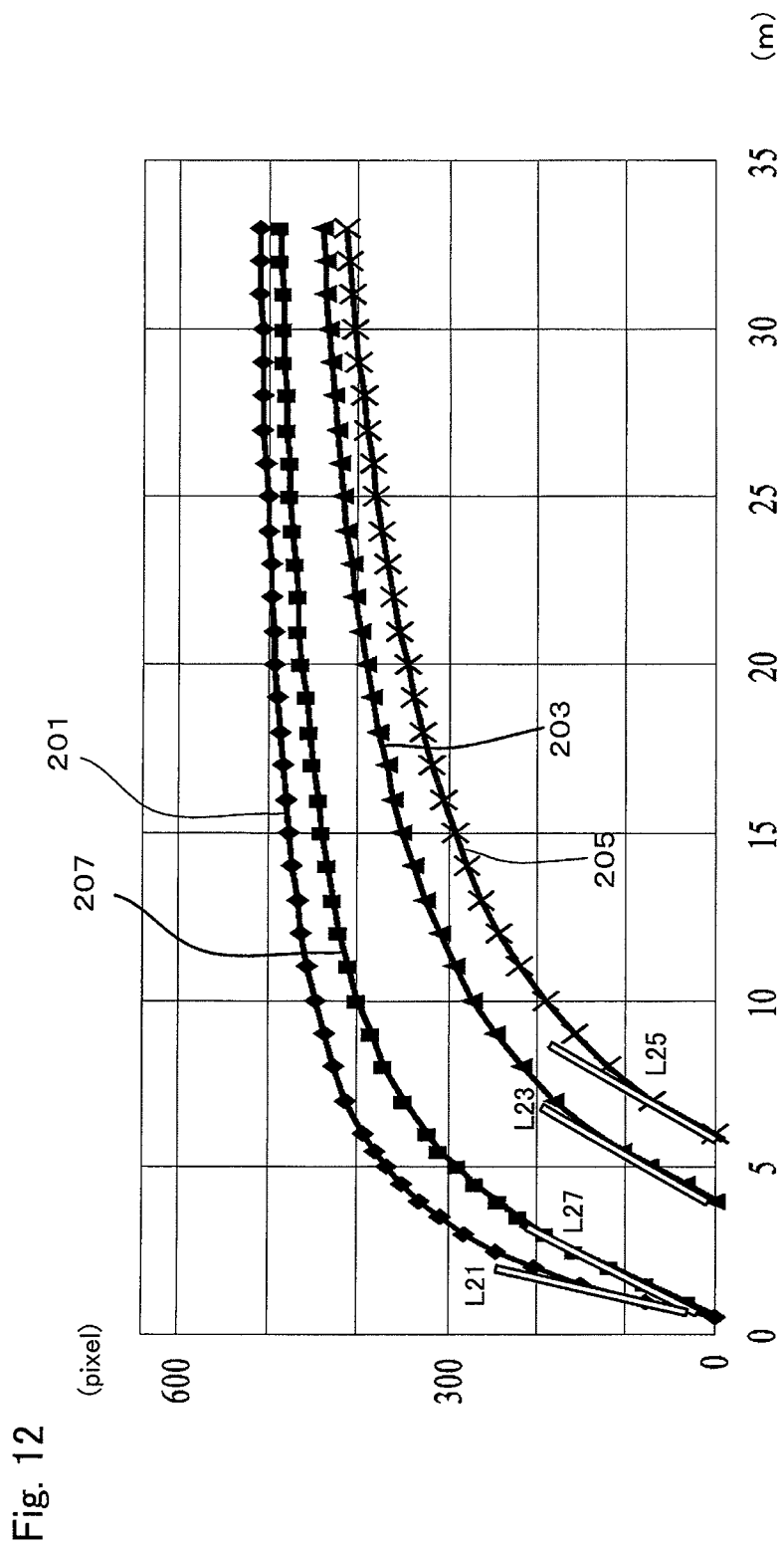
FIG. 12 is a graph showing a position of a object in a horizontal direction on a screen relative to a distance value from a vehicle.

FIG. 12 is a view showing one example of experimental results according to one embodiment of the present invention. In this experiment, another vehicle Va travels from the rear at a constant speed from the back 50 m far from the own vehicle, while the own vehicle Vo is at stand still. As shown in FIG. 3, the point P is set at the front center of the other vehicle Va.

Here, the imaging device 13 with the lens having an angle of view of 80 degrees is used, and side mirrors having curvatures of 700 R and 1000 R are used as the side mirrors 16R. At intervals of distance of 1 m, an image taken by the imaging device 13 and an image reflected on the side mirror 16R are captured. A horizontal axis (x axis) indicates a distance (m) from the origin O (FIG. 3), and a vertical axis (y axis) indicates coordinates (represented by pixels) in a horizontal direction of the screen. Here, a width (breadth) of the screen (in case of the imaging device 13, an imaging surface, and in case of the side mirror 16R, a mirror surface) in a horizontal direction is set to 630 pixels. y=0 indicates the right end of the screen and y=640 indicates the left end of the screen.

A graph 201 is a graph plotting movement of the point P' formed by projecting the point P on the image (the original image) captured by the imaging device 13. A graph 203 is a graph plotting movement of the point P' formed by projecting the point P on the side mirror 16R having a curvature of 700 R. A graph 205 is a graph plotting movement of the points P' formed by projecting the point P on the side mirror 16R having a curvature of 1000 R. A graph 207 is a graph plotting movement of the point P on the target image obtained by applying the scaling process, as described above, to the original image. Further, as with FIG. 7, the maximum value (i.e., the maximum value of a inclination of these graphs) of a moving speed of the point P' are represented respectively by straight lines L21 to L27 in the graphs 201 to 207.

In the experimental results, the maximum value of the inclination of the graph 203 represented by the straight line L23 is 100 (the number of pixels/second), and the maximum value of the inclination of the graph 205 represented by the straight line L25 is 105 (the number of pixels/second). They approximately matches with each other. In contrast, the maximum value of the inclination of the graph 201 of the straight line L21 is 160 (the number of pixels/second), which is about 1.6 times to the maximum value of the side mirror represented by the straight lines L23 and L25.

On the other hand, the maximum value of the inclination of the graph 207 represented by the straight line L27 is 110 (the number of pixels/second), which approximately matches the maximum value of the inclination of the side mirror represented by the straight lines L23 and L25. In this way, with the above described image processing, the moving speed of the object on the image presented on the display device 15 approximately matches the moving speed of the object on the side mirror.

Figure 13:
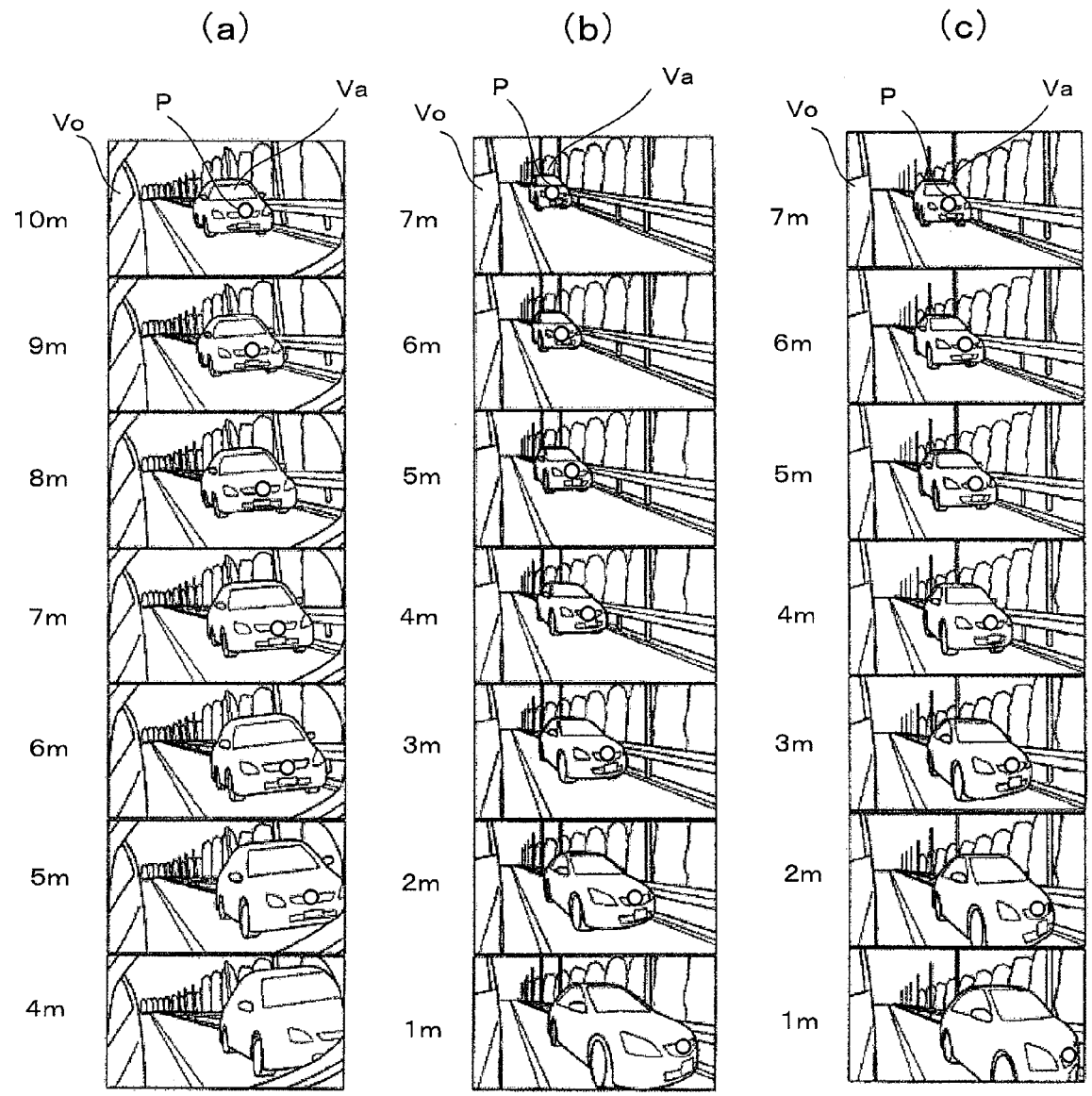
FIG. 13 is a view showing an image acquired on a screen by an experiment relative to each distance according to one embodiment of the present invention.

FIG. 13 shows, according to distance from the origin O (the own vehicle), (a) an image reflected on the side mirror having a curvature of 700 R, (b) the original image taken by the imaging device 13, and (c) an image after the scaling process is applied to the original image. A point P indicated by a white circle is marked on a position at the front center of the other vehicle Va. In FIG. 13, (a) and (b) are the same as those in FIG. 14.

As mentioned above, when another vehicle Va enters the blind spot region (the region within about 4 m from the origin O to the backwards), the amount of transition in a position in the horizontal direction of the point P suddenly increases in the original image shown in (b), and therefore it looks as if the other vehicle Va suddenly accelerates. However, the amount of transition in a position in the horizontal direction of the point P is suppressed in the image after the scaling process as shown in (c), as compared with that shown in (b). As a result, the event that the other vehicle Va looks suddenly accelerating is suppressed. Since a moving speed of the other vehicle Va in the image shown in (c) is close to that of the other vehicle Va reflected on the side mirror, the speed of the other vehicle in the rear of the own vehicle recognized by a driver from the captured image approximately matches that of the other vehicle recognized by the driver from the side mirror. Even when both the image reflected on the side mirror and the image taken by the imaging device are used, the occurrence of the event looking as if the other vehicle suddenly accelerates or decelerates in the captured image is suppressed, thereby allowing the driver to recognize correct acceleration or deceleration of the other vehicle.

Further, in the original image shown in (b), as the other vehicle Va approaches the own vehicle, the other vehicle is displayed in an unnatural shape as though the other vehicle expands forward. The scaling process as mentioned above avoids presentation of such an abnormal display as shown in (c). Thus, the occurrence of the event that the object approaching the own vehicle looks in an unnatural shape is avoided.

In the aforesaid embodiments, while the description is made with the other vehicle Va as an object, the present invention may also apply to other objects than a vehicle.

As stated above, while the description is made relative to specific embodiments of the present invention, it is evident that the present invention is not limited to such embodiments.

13: imaging device (camera)
15: display device
16: side mirror
17: image processing unit

The invention claimed is:

1. A driving assisting system comprising:
an imaging device that is mounted on a vehicle to capture images of a rear region of the vehicle including a blind spot region adjacent to the rear region of the vehicle, the blind spot region being outside of a viewing range of a side mirror, and the blind spot region covering a region closer to the vehicle in comparison with the viewing range;
an image processing unit that processes images captured by the imaging device to compress an image region corresponding to the blind spot region on the captured image; and
a display device that displays the image processed by the image processing unit in a manner visible to a driver seated in the vehicle,
wherein the image processing unit is configured to compress the image region corresponding to the blind spot region such that the ratio of transition of position of the object in the horizontal direction on the captured image at a position within the image region corresponding to the blind spot region to transition of distance from the vehicle to the object is substantially the same as the ratio of transition of position of the object in a horizontal direction on the side mirror at a predetermined region of the viewing range including its horizontal boundary to transition of distance from the vehicle to the object.

2. The system according to claim 1, wherein the image processing unit is configured to compress the image region corresponding to the blind spot region such that the ratio of transition of position of the object in the horizontal direction on the captured image at a position within the image region corresponding to the blind spot region to transition of distance from the vehicle to the object is substantially the same as the ratio of transition of position of the object in a horizontal direction on the side mirror at a horizontal boundary of the viewing range to transition of distance from the vehicle to the object.

3. A driving assisting system comprising:
an imaging device that is mounted on a vehicle to capture images of a rear region of the vehicle including a blind spot region adjacent to the rear region of the vehicle, the blind spot region being outside of a viewing range of a side mirror;

an image processing unit that processes images captured by the imaging device to compress an image region corresponding to the blind spot region on the captured image; and
a display device that displays the image processed by the image processing unit in a manner visible to a driver seated in the vehicle,
wherein the image processing unit is configured to compress the image region corresponding to the blind spot region such that the maximum value of the ratio of transition of position of the object in the horizontal direction on the captured image over the image region corresponding to the blind spot region to transition of distance from the vehicle to the object is substantially the same as the maximum value of the ratio of transition of position of the object in a horizontal direction on the side mirror over the viewing range to transition of distance from the vehicle to the object.

4. The driving assisting system according to claim 3, wherein the image processing unit is configured to compress the image region corresponding to the blind spot region according to an objective function of position in the horizontal direction on the captured image with respect to the distance.

5. The system according to claim 4, wherein transition of position of the object in the horizontal direction on the captured image relative to transition of distance from the vehicle to the object is taken as a first function,
and wherein the image processing unit is configured to compress the image region corresponding to the blind spot region at a compression ratio based on the ratio of an inclination of the first function to an inclination of the objective function.

6. A driving assisting system comprising:
means for capturing images of a rear region of the vehicle including a blind spot region adjacent to the rear region of the vehicle, the blind spot region being outside of a viewing range of a side mirror, and the blind spot region covering a region closer to the vehicle in comparison with the viewing range;
means for processing images captured by the means for capturing to compress an image region corresponding to the blind spot region on the captured image; and
means for displaying the image processed by the means for processing in a manner visible to a driver seated in the vehicle,
wherein the means for processing compresses the image region corresponding to the blind spot region such that the ratio of transition of position of the object in the horizontal direction on the captured image at a position within the image region corresponding to the blind spot region to transition of distance from the vehicle to the object is substantially the same as the ratio of transition of position of the object in a horizontal direction on the side mirror at a predetermined region of the viewing range including its horizontal boundary to transition of distance from the vehicle to the object.

7. The system according to claim 6, wherein the means for processing compresses the image region corresponding to the blind spot region such that the ratio of transition of position of the object in the horizontal direction on the captured image at a position within the image region corresponding to the blind spot region to transition of distance from the vehicle to the object is substantially the same as the ratio of transition of position of the object in a horizontal direction on the side mirror at a horizontal boundary of the viewing range to transition of distance from the vehicle to the object.

8. A driving assisting system comprising:
means for capturing images of a rear region of the vehicle including a blind spot region adjacent to the rear region of the vehicle, the blind spot region being outside of a viewing range of a side mirror;
means for processing images captured by the means for capturing to compress an image region corresponding to the blind spot region on the captured image; and
means for displaying the image processed by the means for processing in a manner visible to a driver seated in the vehicle,
wherein the means for processing compresses the image region corresponding to the blind spot region such that the maximum value of the ratio of transition of position of the object in the horizontal direction on the captured image over the image region corresponding to the blind spot region to transition of distance from the vehicle to the object is substantially the same as the maximum value of the ratio of transition of position of the object in a horizontal direction on the side mirror over the viewing range to transition of distance from the vehicle to the object.

9. The system according to claim 8, wherein the means for processing compresses the image region corresponding to the blind spot region according to an objective function of position in the horizontal direction on the captured image with respect to the distance.

10. The system according to claim 9, wherein transition of position of the object in the horizontal direction on the captured image relative to transition of distance from the vehicle to the object is taken as a first function,
and wherein the means for processing compresses the image region corresponding to the blind spot region at a compression ratio based on the ratio of an inclination of the first function to an inclination of the objective function.

11. A method for assisting driving, comprising steps of:
capturing images of a rear region of the vehicle including a blind spot region adjacent to the rear region of the vehicle, the blind spot region being outside of a viewing range of a side mirror, and the blind spot region covering a region closer to the vehicle in comparison with the viewing range;
processing captured images to compress an image region corresponding to the blind spot region on the captured image, thereby generating a processed image; and
displaying the processed image in a manner visible to a driver seated in the vehicle,
wherein the processing step includes, compressing the image region corresponding to the blind spot region such that the ratio of transition of position of the object in the horizontal direction on the captured image at a position within the image region corresponding to the blind spot region to transition of distance from the vehicle to the object is substantially the same as the ratio of transition of position of the object in a horizontal direction on the side mirror at a predetermined region of the viewing range including its horizontal boundary to transition of distance from the vehicle to the object.

12. The method according to claim 11, wherein the processing step includes,
compressing the image region corresponding to the blind spot region such that the ratio of transition of position of the object in the horizontal direction on the captured image at a position within the image region corresponding to the blind spot region to transition of distance from the vehicle to the object is substantially the same as the ratio of transition of position of the object in a horizontal direction on the side mirror at a horizontal boundary of the viewing range to transition of distance from the vehicle to the object.

13. A method for assisting driving, comprising steps of:
capturing images of a rear region of the vehicle including a blind spot region adjacent to the rear region of the vehicle, the blind spot region being outside of a viewing range of a side mirror;
processing captured images to compress an image region corresponding to the blind spot region on the captured image, thereby generating a processed image; and
displaying the processed image in a manner visible to a driver seated in the vehicle,
wherein the processing step includes, compressing the image region corresponding to the blind spot region such that the maximum value of the ratio of transition of position of the object in the horizontal direction on the captured image over the image region corresponding to the blind spot region to transition of distance from the vehicle to the object is substantially the same as the maximum value of the ratio of transition of position of the object in a horizontal direction on the side mirror over the viewing range to transition of distance from the vehicle to the object.

14. The method according to claim 13, wherein the processing step includes, compressing the image region corresponding to the blind spot region according to an objective function of position in the horizontal direction on the captured image with respect to the distance.

15. The method according to claim 14, wherein transition of position of the object in the horizontal direction on the captured image relative to transition of distance from the vehicle to the object is taken as a first function,
and wherein the processing step includes, compressing the image region corresponding to the blind spot region at a compression ratio based on the ratio of an inclination of the first function to an inclination of the objective function.

* * * * *